US009176879B2

(12) United States Patent  
Lilly et al.

(10) Patent No.: US 9,176,879 B2  
(45) Date of Patent: Nov. 3, 2015

(54) LEAST RECENTLY USED MECHANISM FOR CACHE LINE EVICTION FROM A CACHE MEMORY

(71) Applicant: Apple Inc., Cupertino, CA (US)

(72) Inventors: Brian P. Lilly, San Francisco, CA (US); Gerard R. Williams, III, Los Altos, CA (US); Mahnaz Sadoughi-Yarandi, Santa Clara, CA (US); Perumal R. Subramonium, San Jose, CA (US); Hari S. Kannan, Sunnyvale, CA (US); Prashant Jain, San Jose, CA (US)

(73) Assignee: Apple Inc., Cupertino, CA (US)

( * ) Notice: Subject to any disclaimer, the term of this patent is extended or adjusted under 35 U.S.C. 154(b) by 187 days.

(21) Appl. No.: 13/946,327

(22) Filed: Jul. 19, 2013

(65) Prior Publication Data

US 2015/0026404 A1     Jan. 22, 2015

(51) Int. Cl.  
   *G06F 12/08*         (2006.01)  
   *G06F 12/12*         (2006.01)

(52) U.S. Cl.  
   CPC ........ *G06F 12/0862* (2013.01); *G06F 12/0897* (2013.01); *G06F 12/123* (2013.01); *G06F 12/127* (2013.01)

(58) Field of Classification Search  
   CPC    G06F 12/0897; G06F 12/0862; G06F 12/123  
   USPC .................................................. 711/122, 136  
   See application file for complete search history.

(56) References Cited

U.S. PATENT DOCUMENTS

| | | | |
|---|---|---|---|
| 7,975,107 B2 | 7/2011 | Beckmann et al. | |
| 2007/0186045 A1 | 8/2007 | Shannon et al. | |
| 2008/0086599 A1 | 4/2008 | Maron et al. | |
| 2010/0191916 A1* | 7/2010 | Balakrishnan et al. | ....... 711/134 |
| 2011/0153953 A1 | 6/2011 | Khemani et al. | |
| 2011/0320720 A1 | 12/2011 | Walters et al. | |
| 2013/0111139 A1* | 5/2013 | Balakrishnan et al. | ....... 711/122 |
| 2013/0262770 A1* | 10/2013 | Ghai et al. | ..................... 711/122 |

\* cited by examiner

*Primary Examiner* — Than Nguyen  
(74) *Attorney, Agent, or Firm* — Meyertons, Hood, Kivlin, Kowert & Goetzel, P.C.

(57) ABSTRACT

A mechanism for evicting a cache line from a cache memory includes first selecting for eviction a least recently used cache line of a group of invalid cache lines. If all cache lines are valid, selecting for eviction a least recently used cache line of a group of cache lines in which no cache line of the group of cache lines is also stored within a higher level cache memory such as the L1 cache, for example. Lastly, if all cache lines are valid and there are no non-inclusive cache lines, selecting for eviction the least recently used cache line stored in the cache memory.

17 Claims, 4 Drawing Sheets

LEAST RECENTLY USED MECHANISM FOR CACHE LINE EVICTION FROM A CACHE MEMORY

BACKGROUND

1. Technical Field

This disclosure relates to processor cache operation, and more particularly to cache replacement mechanisms.

2. Description of the Related Art

Modern processors use a number of cache memory hierarchies in an effort to expedite data retrieval from main memory. In particular, most all processor cores will have at least a level one (L1) cache that is proximal to the core. In many cases, and especially in multi-core designs, a processor will also have a level two (L2) cache, and in some cases a level three (L3) cache. The L2 and L3 caches are in many cases shared among the various processor cores. The multiple cache hierarchies allow a processing system to keep copies of data that is accessed frequently in the local faster cache memory hierarchy, rather than having to access main memory which is typically slower.

However, even with the increasing size of the L2 and L3 caches, they do fill up, and older cache lines need to be evicted. Generally speaking it is typically the case that the least recently used (LRU) cache line is the line that is evicted. There have been many LRU algorithms used to determine which cache line to evict. For example, round robin algorithms among others are frequently used. Many of these algorithms do work. However, many of them have drawbacks that evict cache lines that for a variety of reasons should have been kept.

SUMMARY OF THE EMBODIMENTS

Various embodiments of a least recently used mechanism for cache line eviction from a cache memory are disclosed. Broadly speaking, a method and system for evicting a cache line from a cache memory include selecting for eviction a least recently used cache line of a group of invalid cache lines. If all cache lines are valid, selecting for eviction a least recently used cache line of a group of cache lines in which no cache line of the group of cache lines is also stored within a higher level cache memory such as the L1 cache, for example. Lastly, if all cache lines are valid and there are no non-inclusive cache lines, selecting for eviction the least recently used cache line stored in the cache memory.

In one embodiment, a method includes selecting for eviction, from a cache memory that stores one or more cache lines, a least recently used cache line of a group of invalid cache lines. The method may also include in response to a determination that no cache lines are invalid, selecting for eviction from the cache memory a least recently used cache line of a group of cache lines in which no cache line of the group of cache lines is also stored within a higher level cache memory. The method may further include in response to a determination that no cache lines are invalid, and in response to a determination that all cache lines of the group of cache lines are also stored within the higher level cache memory, selecting for eviction from the cache memory a least recently used cache line of the one or more cache lines stored in the cache memory.

Figure 1:
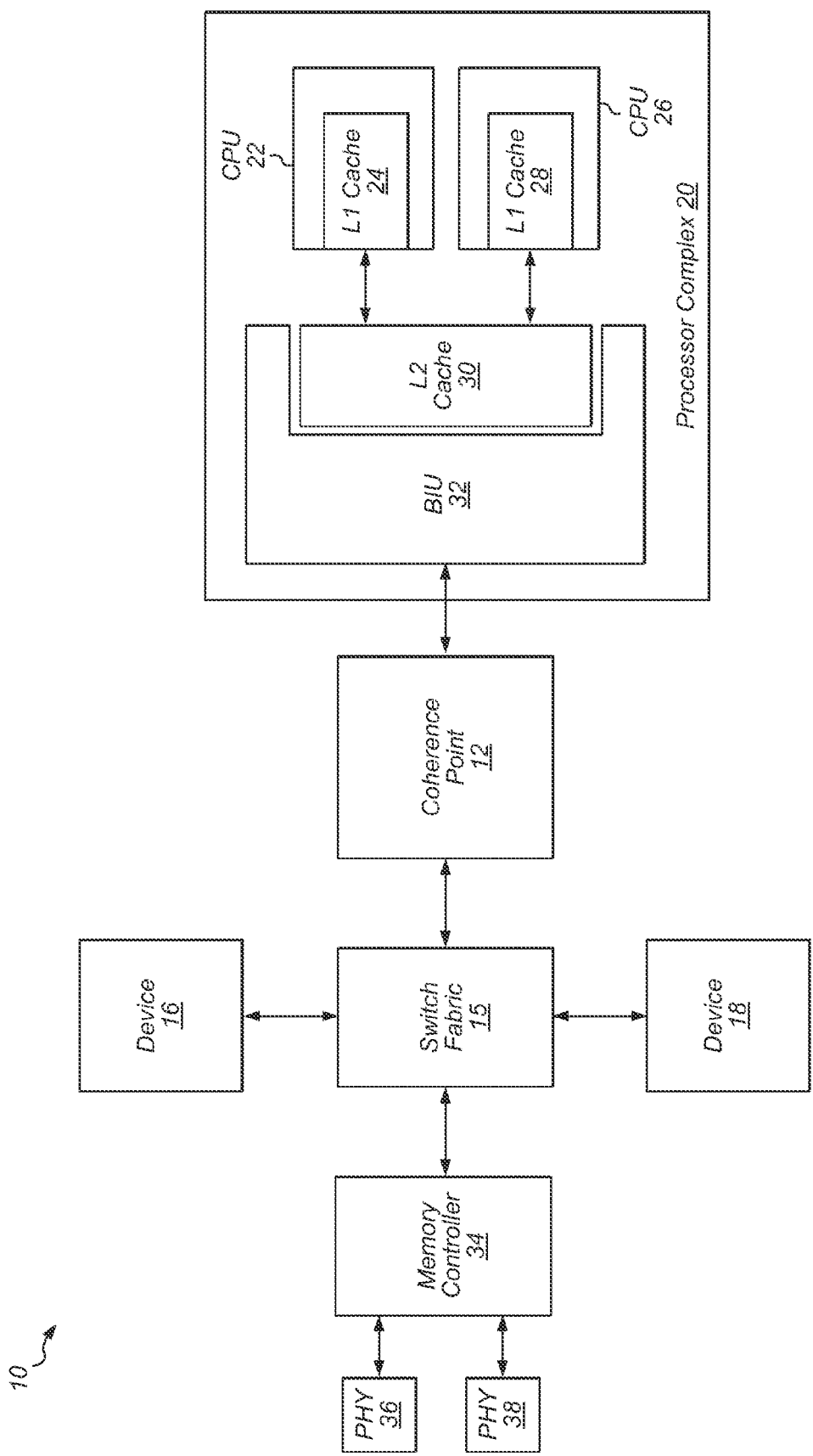
FIG. 1 is a block diagram of one embodiment of an integrated circuit.

Specific embodiments are shown by way of example in the drawings and will herein be described in detail. It should be understood, however, that the drawings and detailed description are not intended to limit the claims to the particular embodiments disclosed, even where only a single embodiment is described with respect to a particular feature. On the contrary, the intention is to cover all modifications, equivalents and alternatives that would be apparent to a person skilled in the art having the benefit of this disclosure. Examples of features provided in the disclosure are intended to be illustrative rather than restrictive unless stated otherwise.

As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, paragraph six, interpretation for that unit/circuit/component.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION

Turning now to FIG. 1, a block diagram illustrating one embodiment of a portion of an integrated circuit (IC) is shown. In the illustrated embodiment, IC 10 includes processor complex 20, coherence point 12, switch fabric 15, devices 16 and 18, memory controller 34, and memory physical interface circuits (PHYs) 36 and 38. It is noted that IC 10 may also include many other components not shown in FIG. 1. In various embodiments, IC 10 may also be referred to as a system on chip (SoC), an application specific integrated circuit (ASIC), or an apparatus.

Processor complex 20 may include central processing units (CPUs) 22 and 26, level two (L2) cache 30, and bus interface unit (BIU) 32. In other embodiments, processor complex 20 may include other numbers of CPUs. CPUs 22 and 26 may also be referred to as processors or processor cores. It is noted that processor complex 20 may also include other components not shown in FIG. 1.

The CPUs 22 and 26 may include circuitry to execute instructions defined in an instruction set architecture. Specifically, one or more programs comprising the instructions may be executed by CPUs 22 and 26. Any instruction set architecture may be implemented in various embodiments. For example, in one embodiment, the ARM™ instruction set architecture (ISA) may be implemented. The ARM instruction set may include 16-bit (or Thumb) and 32-bit instructions. Other exemplary ISA's may include the PowerPC™ instruction set, the MIPS™ instruction set, the SPARC™ instruction set, the x86 instruction set (also referred to as IA-32), the IA-64 instruction set, etc.

As shown, CPU 22 includes a level one (L1) cache 24 and CPU 26 includes an L1 cache 28, and L1 caches 24 and 28 are coupled to L2 cache 30. Other embodiments may include additional cache levels (e.g., level three (L3) cache). L1 caches 24 and 28 and L2 cache 30 may comprise any capacity and configuration (e.g. direct mapped, set associative). L2 cache 30 may be coupled to memory controller 34 via BIU 32, coherence point 12, and switch fabric 15. BIU 32 may include various logic structures to couple CPUs 22 and 26 and L2 cache 30 to various other devices and blocks.

Coherence point 12 may be configured to act as a gateway between the coherent and non-coherent domains in IC 10. Coherence point 12 may be the location in IC 10 where memory operations become globally visible. Coherence point 12 may also include tags from L2 cache 30 for all coherent agents in IC 10 and which may be snooped by coherence point 12 for coherency operations. Coherence point 12 may also include additional logic (e.g., coherence control unit, memory interface unit, current transaction table) not shown in FIG. 1. For example, in various embodiments, coherence point 12 may include cache coherency logic employing a cache coherency protocol to ensure data accessed by each agent is kept up to date. An example of a cache coherency protocol includes the MOESI protocol with the Modified (M), Owned (O), Exclusive (E), Shared (S), and Invalid (I) states. Coherence point 12 may be coupled to switch fabric 15, and coherence point 12 may be coupled to devices 16 and 18 via switch fabric 15. Devices 16 and 18 are representative of any number and type of devices within IC 10. In another embodiment, coherence point 12 and switch fabric 15 may be integrated within a single coherence controller.

Devices 16 and 18 may generally be any type of peripheral device or interface, implementing any hardware functionality included in the system other than the CPUs. For example, the devices 16 and 18 may include video peripherals such as cameras, camera interfaces, image processors, video encoders/decoders, scalers, rotators, blenders, graphics processing units, display controllers, etc. The devices 16 and 18 may include audio peripherals such as microphones, speakers, interfaces to microphones and speakers, audio processors, digital signal processors, mixers, etc. The devices 16 and 18 may include interface controllers for various interfaces external to IC 10, including interfaces such as Universal Serial Bus (USB), peripheral component interconnect (PCI) including PCI Express (PCIe), serial and parallel ports, etc. The devices 16 and 18 may include networking peripherals such as media access controllers (MACs). It is noted that in some embodiments, one or more of devices 16 and 18 may be external to IC 10.

Memory controller 34 may include any number of memory ports and may include circuitry configured to interface to memory. For example, memory controller 34 may be configured to interface to dynamic random access memory (DRAM) such as synchronous DRAM (SDRAM) (including mobile versions of the SDRAMs such as mDDR3, etc., and/or low power versions of the SDRAMs such as LPDDR2, etc.), RAMBUS DRAM (RDRAM), double data rate (DDR) SDRAM, DDR2 SDRAM, Rambus DRAM (RDRAM), static RAM (SRAM), etc. Memory controller 34 may also be coupled to memory physical interface circuits (PHYs) 36 and 38. Memory PHYs 36 and 38 are representative of any number of memory PHYs which may be coupled to memory controller 34. Memory PHYs 36 and 38 may be configured to interface to memory devices (not shown). Memory PHYs 36 and 38 may handle the low-level physical interface to the memory devices. For example, the memory PHYs 36 and 38 may be responsible for the timing of the signals, for proper clocking to synchronous DRAM memory, etc.

It is noted that other embodiments may include other combinations of components, including subsets or supersets of the components shown in FIG. 1 and/or other components. While one instance of a given component may be shown in FIG. 1, other embodiments may include two or more instances of the given component. Similarly, throughout this detailed description, two or more instances of a given component may be included even if only one is shown, and/or embodiments that include only one instance may be used even if multiple instances are shown. In addition, in other embodiments, the connections between components of IC 10 may differ from those shown in FIG. 1. In other words, direct connections between components may be used for components that are not directly connected in FIG. 1, and components with direct connections in FIG. 1 may instead connect via one or more other components.

Figure 2:
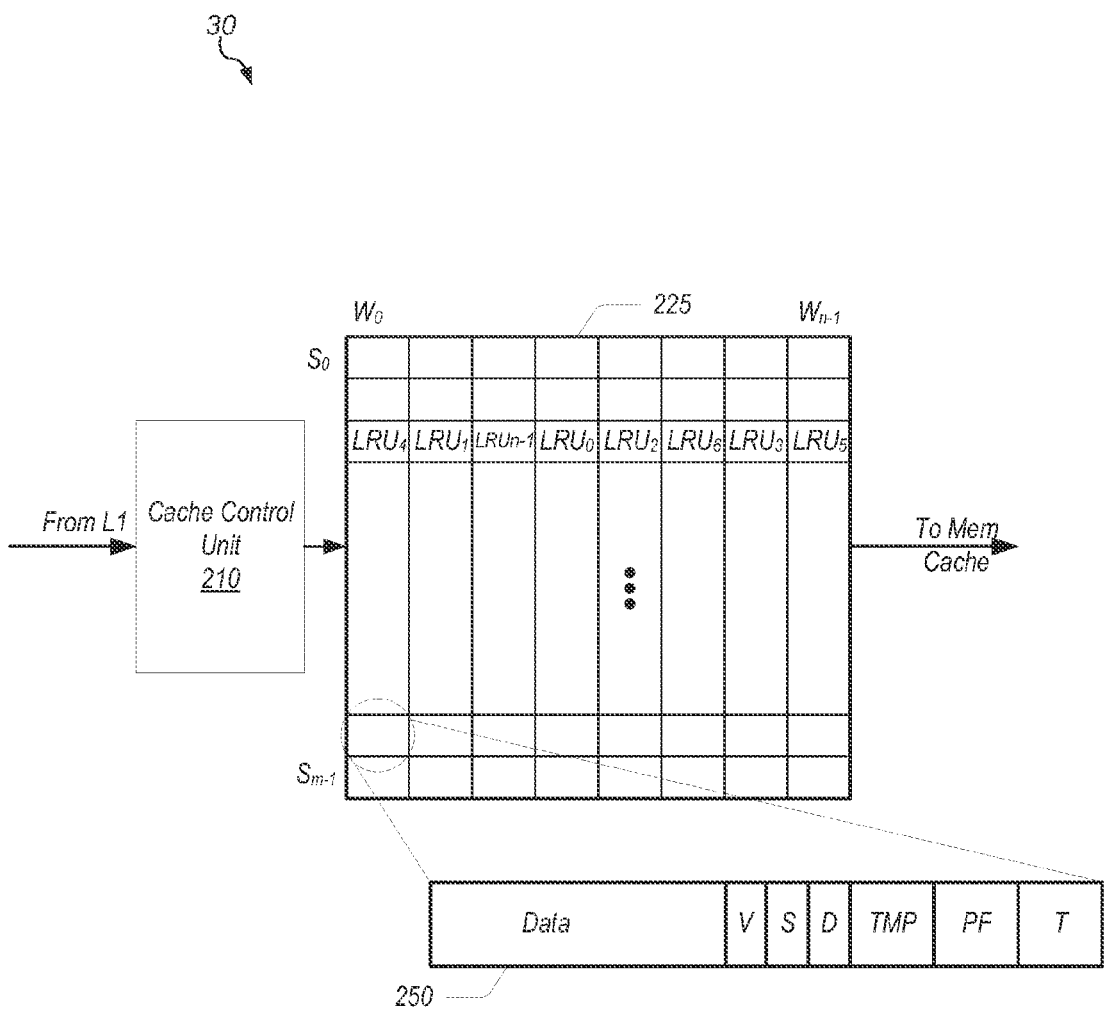
FIG. 2 is a block diagram of depicting more detailed aspects of an embodiment of the cache hierarchy of FIG. 1.

Referring to FIG. 2, a block diagram of one embodiment of the L2 cache of FIG. 1 is shown. As shown in FIG. 2, the L2 cache 30 includes a cache control unit 210 coupled to a storage array 225. In one embodiment, the L2 cache 30 may be configured as a set associative n-way cache. In the illustrated embodiment, the L2 cache 30 includes n ways, which are labeled $W_0$ through $W_{n-1}$, where n may be any natural number. Similarly, the L2 cache 30 is configured to have m sets, which are labeled $S_0$ through $S_{m-1}$, where m may be any natural number.

In one embodiment, the storage array 225 may be configured to store data in a cache line configuration. It is noted that a cache line may be any number of bytes. A representative cache line 250 is shown in the exploded view of FIG. 2. As shown, the cache line 250 includes storage for data as well as a number of state and indicator bits. More particularly, the cache line 250 includes state bits (e.g., V, S, D), and indicator bits (e.g., TMP bit, PF bit, and T bit).

The state bits may indicate the coherence state of the cache line. In one embodiment, the state bits may include a valid (V), shared (S), and dirty (D) bit. The indicator bits indicate various properties of a cache line. In one embodiment, a memory request may be characterized and so indicated by the TMP bit when it is correlated with other memory requests that occur near to it in time. Because these types of memory requests are correlated, they may have precedence when determining least recently used allocation priorities, as described further below. Thus, the TMP bit is a temporal bit that indicates whether the cache line was stored in the L2 cache 30 as a result of a temporal memory request. In one embodiment, the cache control unit 210 may perform prefetch operations from the system memory into the storage array 225. Accordingly, the PF bit indicates whether the cache line was stored in the L2 cache 30 as a result of a prefetch operation by the cache control unit 210. The PF bit may also be used when a cache line is evicted. More particularly, the cache control unit 210 may use the PF bit to determine whether or not the evicted cache line may be stored to a victim buffer. In one embodiment, prefetched cache lines that were not accessed are not stored to the victim buffer when evicted from the L2 cache 30.

Cache lines from the L2 cache 30 that are stored back to the L1 cache 24 or 28 (i.e., made a trip), may be considered to be used more frequently, and may therefore be considered a higher priority in the L2 cache 30. The Trip or T bit indicates that the cache line has been stored in the L1 cache 24 or 28, and was subsequently stored back in the L2 cache 30. Thus, in one embodiment, the T bit may be a sticky bit which is set when a cache line makes more than one trip between the L1 cache 24 or 28 and the L2 cache 30.

The cache control unit 210 may be configured to control storage to and retrieval from the cache storage array 225. In one embodiment, the cache control unit 210 may include logic to determine, allocate, and keep track of the least recently used (LRU) position of cache line entries in the different ways of the cache storage array 225 using a true LRU replacement. The LRU position may be used in determining which cache line is evicted when the cache storage array 225 is full and a new cache line needs to be stored. In one embodiment, each way may be assigned to one of the possible LRU positions, and each set includes all the LRU positions. As shown in the embodiment of FIG. 2, way $W_0$ of an arbitrary set corresponds to $LRU_4$ and way $W_1$ of the same set corresponds to $LRU_1$ and so on up to $LRU_{n-1}$. In this scenario $LRU_0$ represents the least recently used cache line, and the $LRU_{n-1}$ represents the most recently used (MRU) cache line. In other embodiments, different LRU positions may be allocated to different ways of a given set.

Figure 3:
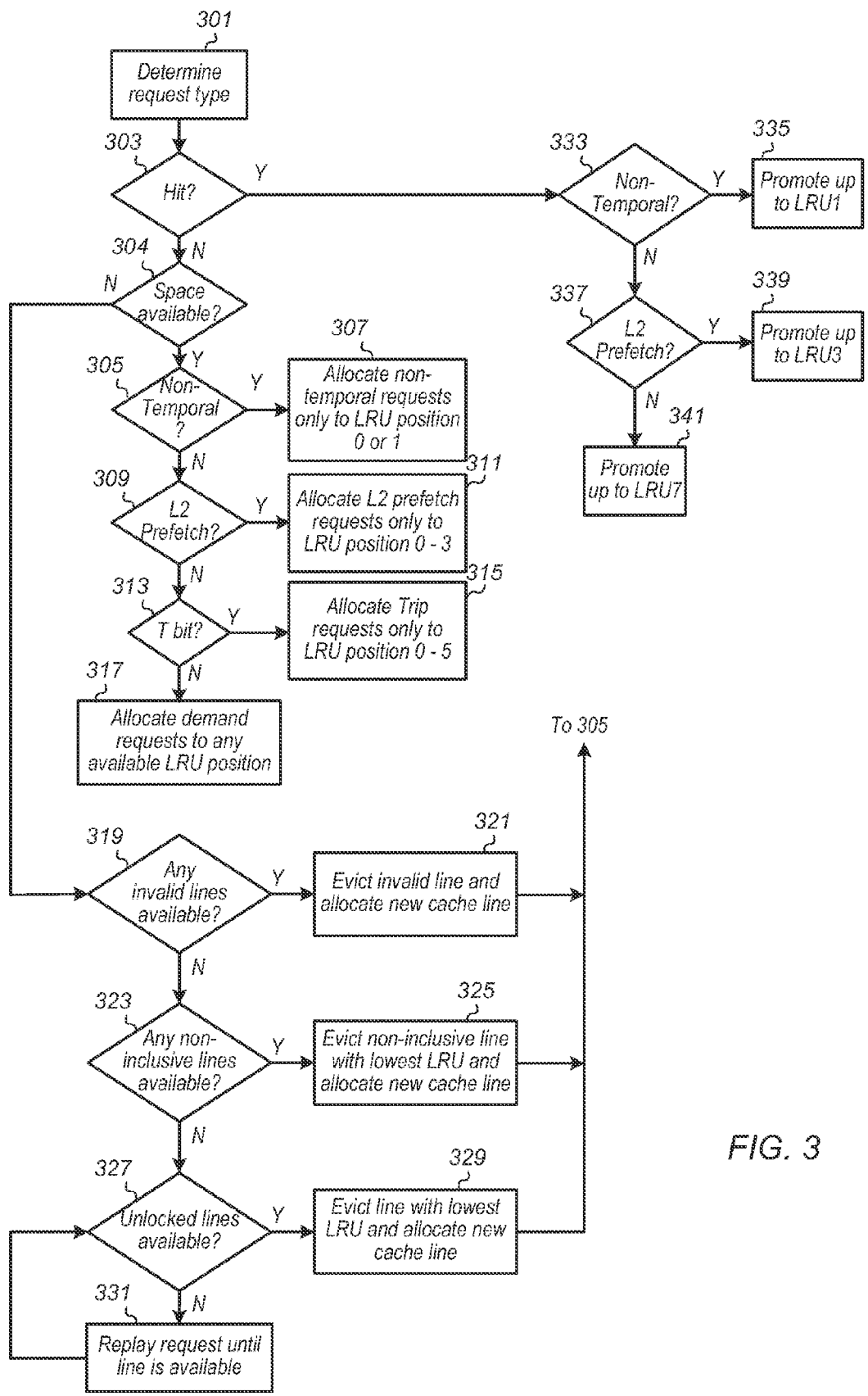
FIG. 3 is a flow diagram describing operational aspects of the L2 cache memory of FIG. 1 and FIG. 2.

In FIG. 3, a flow diagram depicting operational aspects of the embodiments of the L2 cache of FIG. 1 and FIG. 2 is shown. Referring collectively to FIG. 1 through FIG. 3, and beginning in block 301 of FIG. 3, cache control unit 210 of FIG. 2 receives a request. If the request hits in the cache storage array 225 (block 303), the cache control unit determines the type of request. If the request is a non-temporal request (block 333) it may be promoted up to LRU1 if it hits in a low LRU position such as LRU0. However, if a non-temporal request hits on a cache line with an LRU4, for example, the cache line would not be down-graded. If the request is not a non-temporal request (block 333), but the request is an L2 prefetch request (block 337), it may be promoted up to an LRU3 position (block 339). Similarly, the cache line that hit would not be down-graded in the event that it has a higher LRU position. If the request is not an L2 prefetch, then it may be promoted up to the highest LRU position (e.g., LRU7 in an eight-way cache). It is noted that in other embodiments, other LRU allocations are possible and contemplated.

Referring back to block 303, if the request misses in the cache storage array 225, the cache control unit 210 may determine whether there is any space available in the cache storage array 225 to store the cache line (block 304). If there is space available, the cache control unit 210 may allocate the LRU position according to the request type. More particularly, if the request is a non-temporal request (block 305), the control unit 210 may allocate the request as an LRU0 position or LRU1 position (block 307). If the request is not a non-temporal request, but the request is an L2 prefetch request (block 309), the control unit 210 may allocate the request as an LRU0 position through LRU3 position (block 3011). If the request is not an L2 prefetch request, but the request has the T bit set (block 313), the control unit 210 may allocate the request as any LRU position, beginning with the LRU7 position (block 315). Lastly, if the request corresponds to a demand request, the control unit 210 may allocate the request as any LRU position (block 317).

Referring back to block 304, if there is no space available, the cache control unit 210 may determine which cache line to evict based upon the LRU positions of the various cache lines in a given set. More particularly, the cache control unit 210 may first look for an invalid cache line (block 319) in the set, and if there are invalid cache lines, the cache control unit 210 may evict the first invalid cache line in the set, and allocate the new cache line (block 321) as described above beginning at block 305. If there are no invalid lines in the set (block 319), the cache control unit 210 may determine whether there are any cache lines that are non-inclusive in the L1 cache 24 or 28. If there are non-inclusive cache lines (block 232), the cache control unit 210 may evict the non-inclusive cache line with the lowest LRU position in the set, and allocate the new cache line (block 329) as described above beginning at block 305. If there no non-inclusive cache lines (block 232), the cache control unit 210 may determine whether there are any cache lines that are unlocked and available. If there are unlocked cache lines available (block 327), the cache control unit 210 may evict the cache line with the lowest LRU position (block 329). The new cache line is allocated as described above beginning at block 305. However, if there are no unlocked cache lines available, the cache control unit 210 may request that the request be replayed until a cache line is available (block 331).

In one embodiment, the cache control unit 210 may implement a linear feedback shift register (LFSR) based pointer to select the cache line to evict. In such an embodiment, beginning with the position pointed to by the LFSR pointer, the first invalid cache line is picked, and if no lines are invalid, then pick the first non-inclusive cache line. If all lines are valid and inclusive, then pick the first cache line that is not an L2 prefetch. Lastly, if no such lines exist, pick the first unlocked cache line pointed to by the LFSR pointer.

Figure 4:
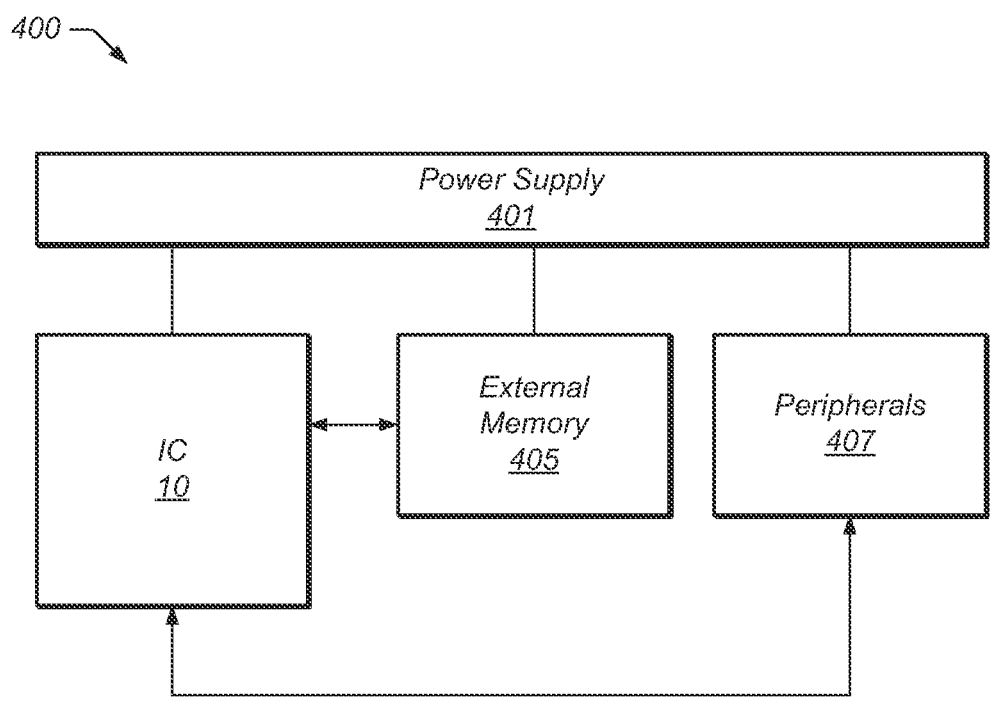
FIG. 4 is a block diagram of one embodiment of a system including the integrated circuit of FIG. 1 and FIG. 2.

Turning to FIG. 4, a block diagram of one embodiment of a system that includes the IC 10 of FIG. 1 is shown. The system 400 includes at least one instance of the IC 10 of FIG. 1 coupled to one or more peripherals 407 and an external system memory 405. The system 400 also includes a power supply 401 that may provide one or more supply voltages to the IC 10 as well as one or more supply voltages to the memory 405 and/or the peripherals 407. In some embodiments, more than one instance of the IC 10 may be included.

The peripherals 407 may include any desired circuitry, depending on the type of system. For example, in one embodiment, the system 400 may be included in a mobile device (e.g., personal digital assistant (PDA), smart phone, etc.) and the peripherals 407 may include devices for various types of wireless communication, such as WiFi, Bluetooth, cellular, global positioning system, etc. The peripherals 407 may also include additional storage, including RAM storage, solid-state storage, or disk storage. The peripherals 407 may include user interface devices such as a display screen, including touch display screens or multitouch display screens, keyboard or other input devices, microphones, speakers, etc. In other embodiments, the system 400 may be included in any type of computing system (e.g., desktop personal computer, laptop, tablet, workstation, net top, etc.).

The system memory 405 may include any type of memory. For example, the system memory 405 may be in the DRAM family such as synchronous DRAM (SDRAM), double data rate (DDR, DDR2, DDR3, etc.), or any low power version thereof. However, system memory 405 may also be implemented in SDRAM, static RAM (SRAM), or other types of RAM, etc.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method comprising:
   selecting for eviction, from a cache memory that stores one or more cache lines, a least recently used cache line of a group of invalid cache lines, wherein each cache line stores a prefetch bit that indicates whether the cache line was generated in response to a cache memory prefetch operation;
   in response to a determination that no cache lines are invalid, selecting for eviction from the cache memory a least recently used cache line of a group of cache lines in which no cache line of the group of cache lines is also stored within a higher level cache memory;
   in response to a determination that no cache lines are invalid, and in response to a determination that all cache lines of the group of cache lines are also stored within the higher level cache memory, selecting for eviction from the cache memory a least recently used cache line of the one or more cache lines stored in the cache memory.

2. The method of claim 1, further comprising replaying a memory request in response to a determination that there are no least recently used cache lines available for eviction.

3. The method of claim 1, further comprising allocating a cached line within a least recently used priority scheme including priority positions zero through seven, wherein the lowest least recently used priority is assigned to positions zero and one, and allocating the lowest least recently used priority to a cache line associated with a non-temporal request, wherein a lower position may be selected for eviction before a higher position.

4. The method of claim 3, further comprising allocating a mid-level least recently used priority to a cache line associated with a cache memory prefetch request, wherein the mid-level least recently used priority is assigned to positions zero through three.

5. The method of claim 1, wherein each cache line stores a trip bit that is indicative of a number of times the corresponding cache line has been stored in the higher level cache memory and subsequently stored in the cache memory.

6. The method of claim 1, wherein each cache line stores a temporal bit that indicates whether the cache line was generated in response to a temporal memory request.

7. An integrated circuit comprising:
   a processor unit coupled to a system memory and configured to execute instructions from the system memory, wherein the processor unit includes one or more processor cores, each including a level one cache memory;
   a level two cache memory coupled to the processor unit and configured to store cache lines retrieved from the system memory, wherein each cache line stores a trip bit that is indicative of a number of times the corresponding cache line has been stored in the level one cache memory and subsequently stored in the level two cache memory;
   wherein the level two cache memory includes a control unit configured to:
      select for eviction, from the level two cache memory, a least recently used cache line of a group of invalid cache lines;
      in response to a determination that no cache lines are invalid, select for eviction from the level two cache memory a least recently used cache line of a group of cache lines in which no cache line of the group of cache lines is also stored within the level one cache memory;
      in response to a determination that no cache lines are invalid, and in response to a determination that all cache lines of the group of cache lines are also stored within the level one cache memory, select for eviction from the level two cache memory a least recently used cache line of the one or more cache lines stored in the level two cache memory.

8. The integrated circuit of claim 7, wherein in response to a determination that there are no unlocked least recently used cache lines available for eviction the control unit is configured to replay a memory request that misses in the level two cache memory.

9. The integrated circuit of claim 7, wherein the control unit is further configured to allocate a cached line within a least recently used priority scheme including priority positions zero through seven, wherein position zero may be selected for eviction before a higher numbered position, and to allocate position zero through position one to a cache line associated with a non-temporal request.

10. The integrated circuit of claim 9, wherein the control unit is further configured to allocate a cache line associated with a level two cache memory prefetch request to positions zero through three.

11. The integrated circuit of claim 9, wherein the control unit is configured to promote a cache line to a higher position in response to a hit in the level two cache memory dependent upon whether a related memory request corresponds to a non-temporal request, a prefetch request, or a temporal request.

12. The integrated circuit of claim 7, wherein each cache line stores a prefetch bit that indicates whether or not the cache line was generated in response to a level two cache memory prefetch operation.

13. The integrated circuit of claim 7, wherein each cache line stores a temporal bit that indicates whether the cache line was generated in response to a temporal memory request.

14. A mobile device comprising:
   a system memory configured to store instructions and data;
   a processor unit coupled to the system memory and configured to execute the instructions, wherein the processor unit includes one or more processor cores, each including a level one cache memory;
   a level two cache memory coupled to the processor unit and configured to store cache lines retrieved from the system memory, wherein each cache line stores a prefetch bit that indicates whether or not the cache line was generated in response to a level two cache memory prefetch operation;
   wherein the level two cache memory includes a control unit configured to:
      select for eviction, from the level two cache memory, a least recently used cache line of a group of invalid cache lines;
      in response to a determination that no cache lines are invalid, select for eviction from the level two cache memory a least recently used cache line of a group of cache lines in which no cache line of the group of cache lines is also stored within the level one cache memory;

in response to a determination that no cache lines are invalid, and in response to a determination that all cache lines of the group of cache lines are also stored within the level one cache memory, select for eviction from the level two cache memory a least recently used cache line of the one or more cache lines stored in the level two cache memory.

15. The mobile device of claim 14, wherein the control unit is further configured to allocate a cached line within a least recently used priority scheme including priority positions zero through seven, wherein position zero may be selected for eviction before a higher numbered position, and to allocate position zero through position one to a cache line associated with a non-temporal request.

16. The mobile device of claim 15, wherein the control unit is further configured to allocate a cache line associated with a level two cache memory prefetch request to positions zero through three.

17. The mobile device of claim 14, wherein each cache line stores a trip bit that is indicative of a number of times the corresponding cache line has been stored in the level one cache memory and subsequently stored in the level two cache memory.

* * * * *